A. J. COLLAR.
FISH SCREEN.
APPLICATION FILED APR. 17, 1911.

1,011,119. Patented Dec. 5, 1911.

Witnesses
Thos Castberg
F. E. Maynard

Inventor
Adoniram J. Collar
by G. H. Strong
his Atty

UNITED STATES PATENT OFFICE.

ADONIRAM J. COLLAR, OF YREKA, CALIFORNIA.

FISH-SCREEN.

1,011,119.  Specification of Letters Patent.  Patented Dec. 5, 1911.

Application filed April 17, 1911. Serial No. 621,668.

*To all whom it may concern:*

Be it known that I, ADONIRAM J. COLLAR, a citizen of the United States, residing at Yreka, in the county of Siskiyou and State of California, have invented new and useful Improvements in Fish-Screens, of which the following is a specification.

This invention relates to fish screens.

The object of the present invention is to provide means for the prevention of the escape and travel of small fish and animals from the head waters, main canals, and the like, into irrigating ditches or flumes; and particularly to provide a screen not only effective to prevent the migration of fish but which will also be self-cleaning; and to provide and insure that the screen will be sufficiently clean at all times to permit the free passage of water from one side to the other in the flume or ditch.

The invention consists of the parts and the construction and combination of parts, as hereinafter more fully described and claimed, having reference to the accompanying drawings, in which—

Figure 1:
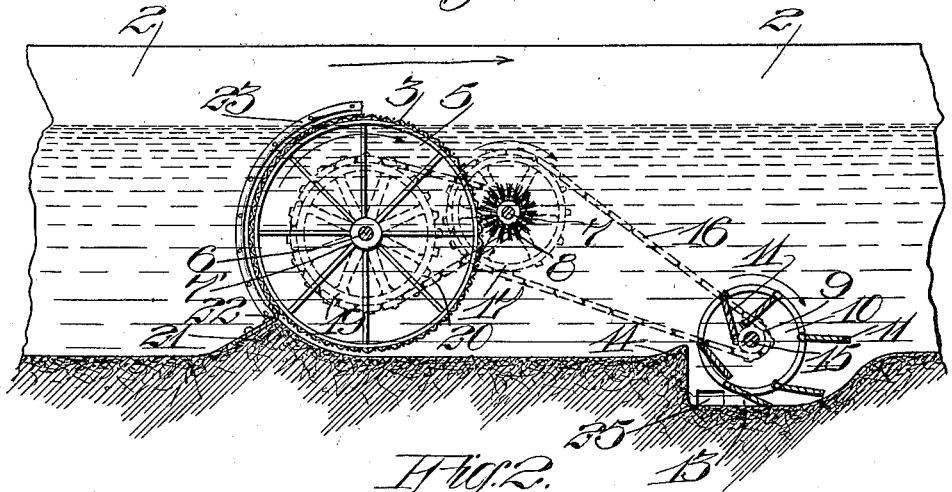
Figure 2:
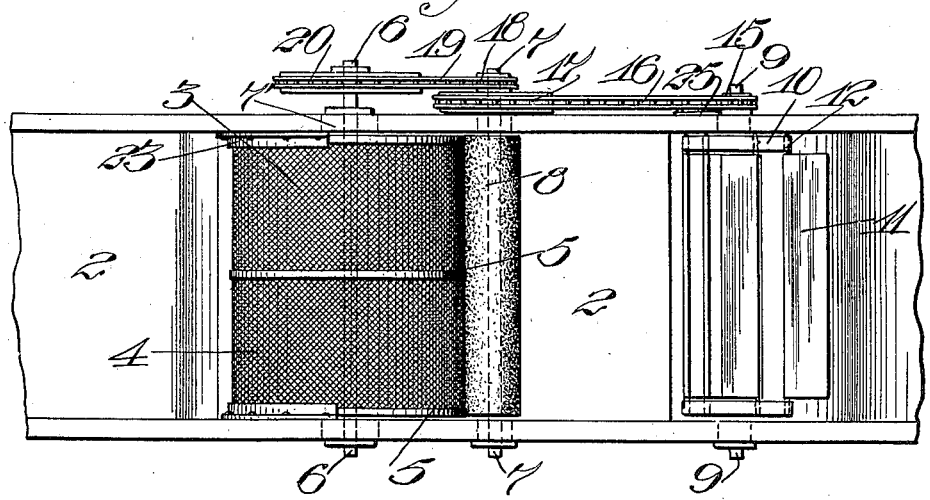

Figure 1 is a vertical section showing the device. Fig. 2 is a plan view.

In the present embodiment of my invention 2 represents a flume, ditch, canal or other conduit for water. Water is permitted to flow into the conduit 2 from any head or source of supply, and it frequently happens that there is some form of life, as fish or other animals, which it is desired to prevent from passing from the conduit 2, for the reason that when the water in the canal or conduit 2 has been finally delivered to its point of distribution the form of animal life in the water is thus destroyed. It is to prevent this destruction that I provide a foraminous drum 3 of suitable proportions in length and width so as to extend fully across the volume of water flowing into the conduit 2. The drum 3 may be provided with a perforated or meshed screen surface, as 4. This surface or material is supported by suitable heads or disks 5, which are attached to the shaft 6, mounted in suitable bearings 7' in the walls of the conduit 2. The mesh or fineness of the screen material 4 is such as will comply with the requirements of the law in this regard. It frequently occurs that debris, floatsam, grass and other deleterious material in the water will accumulate in such quantities upon the screen 4 as to materially interfere with the continuous flow of a given quantity of water through the conduit 2.

It is a comparatively simple thing to provide a screen which will be effective to prevent the travel of small fish from the head water into the conduit 2, but an important purpose of the present invention is to insure that at all times the surface or screen 4 will be sufficiently scoured and cleansed as to permit the free passage of water. This cleansing of the drum 3 is accomplished by mounting a shaft 7 upon suitable bearings in the walls of the conduit 2. Upon this shaft 7 and between the walls of the conduit there is mounted a brush or scrubber 8 normally contacting the surface 4 of the drum 3. The best effect and maximum efficiency of the screening apparatus can be accomplished by rotating the screen or drum constantly at a suitable speed and also rotating the scrubber 8 so that the ends of the scrubbing device will constantly brush or scrub the surface 4.

Any suitable means may be provided whereby power may be applied to drive the shaft 7 upon which the brush 8 is provided. It is desirable to operate the brush 8 with power derived from the current flowing through the conduit 2. To that effect, there is mounted at a suitable position in and transverse to the conduit 2, a shaft 9 carrying suitable wheels or disks 10 upon which are mounted feathering blades or paddles 11, which are pivoted along their outer edges, as at 12, to the wheels 10. The inner ends of the paddles 11 are free to swing about the points 12 as pivots, and, as shown in Fig. 1, the current of water is effective on its blades which are above the center of the shaft 9 to swing the blades with their inner faces adjacent the shaft so that the force of the water upon the blades will turn the wheels and shaft in the direction indicated by the arrow.

It may sometimes be desirable to form a slight recess, as 13, in the bottom of the conduit 2 so that those blades or paddles 11 which are passing below the center of the shaft 9 may swing freely and without resistance in the area formed by the depression 13. To enhance the velocity of the water against the blades 11 passing above the center 9, there may be formed upon the bottom of the conduit 2 and in front of the paddle wheel a deflecting surface, as 14, effective to direct the current of water upwardly and forcibly against the upper blades 11.

The shaft 9 is continued through the side of the conduit 2. Upon the outer end of the shaft 9 is secured a sprocket wheel or equivalent device 15 over which may run a chain or belt 16, traveling forward to and over a simple transmitting wheel 17 secured upon the outer end of the shaft 7. By this means power is transmitted from the motor shaft 9 to the scrubber shaft 7; and from this shaft power may be transmitted by a sprocket wheel 18 secured thereon and over which runs a sprocket chain 19 traveling on a large sprocket wheel 20 attached to the shaft 6 of the drum 3.

The direction of rotation of the shafts 6 and 7 is similar, so that the edge of the scrubbing device 8, adjacent to the foraminous surface 4 moves in an opposite direction to the screened surface, thus constantly scrubs and scours the latter to remove all accumulations, such as clay, silt, moss, weeds and other material detrimental to the successful operation of the screen.

In order to prevent any small fish from passing between the running joints necessary where the drum 3 abuts the side walls and runs adjacent to the bottom of the conduit 2, I have formed upon the bottom of the conduit 2 a projecting ledge or abutment 21, the forward outer face of which is inclined upwardly so as to direct the current toward the central portion of the screen 4. The slight space necessary for clearance of the drum 3 is covered by a flexible strip or member 22 attached to the apex of the abutment 21 and extending transversely across the conduit and adapted to constantly bear upon the surface 4 so that it is impossible for small fish or animals to escape through the necessary clearance provided. Similarly the vertical running joints of the ends of the drum 3 adjacent to the walls of the conduit 2 are guarded to prevent the passage of fish by strips 23, of suitable material, normally under constant engagement with the face of the surface 4. The paddle wheel 10 is entirely submerged, as shown, but the screened drum 3 may project above the upper surface of the water so as to effectively prevent any fish from moving over the drum. A particular function of the abutment 21 formed in front of the drum 3 is to prevent the accumulation of waterlogged material, sand, etc., in the angular space below and in front of the drum 3 along the bottom of the conduit.

It will be observed that in the present construction the power wheel, screen and the brush are all adapted to rotate in the same direction to facilitate the passage of rubbish over the submerged wheel without damaging it. Access may be had to the depression in which the power wheel runs by means of a door 25 provided in a side of the conduit 2.

Having thus described my invention, what I claim and desire to secure by Letters Patent, is—

1. A screen for canals, conduits, flumes, ditches, etc., including a cylindrical foraminous drum, bearings for said drum, and an overshot water wheel mounted in the canal and adapted to rotate said drum.

2. A screen for canals, conduits, flumes, ditches, etc., including a cylindrical foraminous drum, bearings for said drum, an overshot water wheel mounted in the canal, and connections set between said water wheel and the drum whereby the latter is revolved.

3. A device for water conduits, comprising a cylindrical screen rotatably mounted transverse the conduit, an overshot water wheel transversely disposed in the conduit and adapted to operate said screen, and means for scrubbing the screen.

4. A self-cleaning screen for water conduits, comprising a rotary screened drum, power transmitting mechanism connected thereto, a scrubbing device adapted to brush against the surface of the drum, and means for actuating said scrubbing device, said means including an over-shot water wheel within the conduit and driving connections from said wheel to the scrubbing device.

5. The combination with a water conduit, of a cylindrical rotary screen, means for revolving said screen, instrumentalities adapted to scrub the surface of the screen, and devices arranged to cover the running joints of the screen adjacent the walls and bottom of the conduit.

6. A device for screening water flowing through a conduit, comprising a rotary screen, a rotary scrubber engaging the surface of the screen, an over-shot wheel and connections for rotating the screen and scrubber, and flexible packing members placed along the sides and bottom of the conduit and adapted to prevent the passage of fish and deleterious material through the running joints between the screen and the walls of the conduit.

7. A device for screening water passing through a conduit, comprising a cylindrical screen, a gear connected to said screen, a scrubber engageable with the surface of the screen, a gear connected to the scrubber and by which power is transmitted to the aforesaid gear connected to the screen, and an overshot water wheel submerged in the water in the conduit whereby power is generated to drive the scrubber and the screen.

In testimony whereof I have hereunto set my hand in the presence of two subscribing witnesses.

ADONIRAM J. COLLAR.

Witnesses:
 CARRA L. BUSH,
 JAS. R. TAPSCOTT.